UNITED STATES PATENT OFFICE.

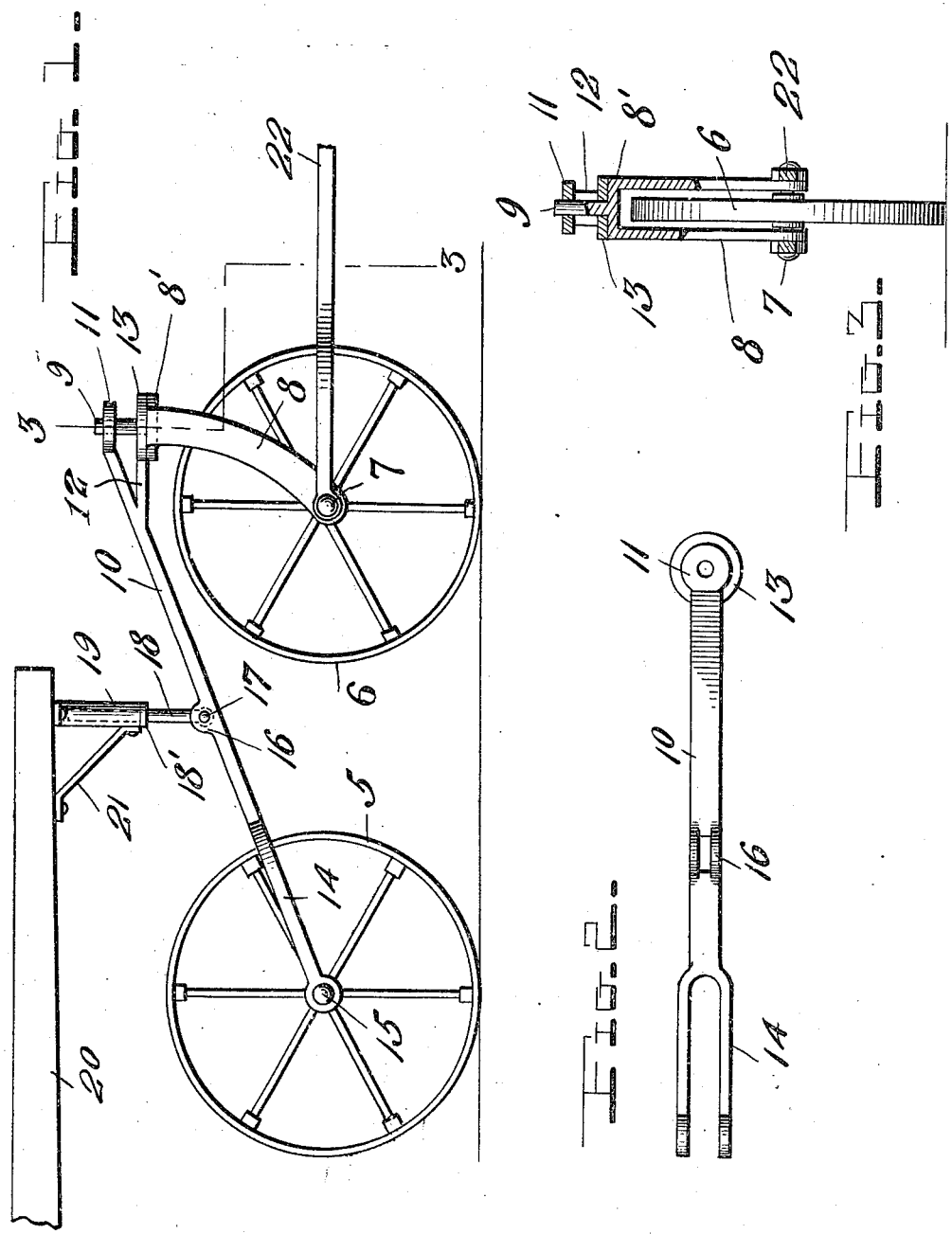

GEORGE G. HELMKE, OF PRATT, KANSAS.

SUPPORTING-TRUCK FOR AGRICULTURAL MACHINES.

949,071. Specification of Letters Patent. Patented Feb. 15, 1910.

Application filed November 10, 1909. Serial No. 527,313.

*To all whom it may concern:*

Be it known that I, GEORGE G. HELMKE, a citizen of the United States, residing at Pratt, in the county of Pratt and State of Kansas, have invented certain new and useful Improvements in Supporting-Trucks for Agricultural Machines, of which the following is a specification, reference being had to the accompanying drawings.

This invention relates to certain new and useful improvements in supporting trucks of that character which are adapted to be removably positioned beneath the tongue of farm implements such as disk harrows, cultivators, plows etc.

The principal object of the present invention is to provide a supporting truck for such a machine which is of simple construction and is adapted to absorb the shock or vibration which is imparted thereto by the truck wheels encountering obstacles in the line of movement.

A further object is to provide a truck frame of very simple and substantial construction which is adapted to receive at its forward end the cylindrical stud of a yoke which straddles the forward truck wheel, the rear end of said frame being bifurcated or forked and having its ends secured upon the rear wheel axle, the tongue of the machine frame having a depending tubular member secured thereto adapted to receive a pivoted rod centrally carried by the truck frame.

With these and other objects in view, the invention consists of the novel construction, combination and arrangement of parts, hereinafter fully described and claimed, and illustrated in the accompanying drawings in which, Figure 1 is a side elevation of a supporting truck constructed in accordance with the present invention; Fig. 2 is a top plan view of the supporting bar, and Fig. 3 is a vertical section taken on the line 3—3 of Fig. 1.

Referring to the drawings 5 indicates the rear, and 6 the front, wheel of the supporting truck. These wheels are arranged in horizontal alinement and to the axle 7 of the front wheel the ends of a yoke 8 are secured. The arms of this yoke are vertically disposed and straddle the wheel, said yoke being circularly formed as at 8' over the wheel and provided with a vertical cylindrical stud 9. The frame of the truck comprises a single bar 10 which is disposed at an inclination between the wheels, as shown in Fig. 1, and has its upper end horizontally extended and circularly formed, as at 11. This end of the bar is provided with an opening to receive the upper end of the stud or bolt 9. The horizonal arm 12 is integrally formed with the bar 10 and extends therefrom in spaced relation to its circular end 11. The outer end of this arm is also formed with a circular plate 13 of larger diameter than the end 11, and likewise provided with a central opening, through which the stud 9 is removably positioned. The lower or rear end of the bar 10 is bifurcated, as shown at 14, and has its extremities secured to the rear wheel axle 15. Intermediate of its ends the supporting bar is formed with the spaced ears 16, in which a transverse pivot pin 17 is secured. The lower end of a rod 18 is journaled on this pin and extends vertically upward into the tubular member 19 secured to the under side of the tongue of the machine 20. This member 19 is braced and strengthened by means of the angle bar 21 which is secured to the lower end thereof and to the tongue. A flange or collar 18' is secured on the rod 18 and limits its movement into the tubular member 19.

In operation, the truck is arranged, as shown in Fig. 1, beneath the tongue 20, the rod 18 having rotative movement in the tubular member so that the truck may be easily turned. It will be obvious that when the front wheel 6 of the truck strikes an obstacle that the shock or vibration which would otherwise be imparted to the frame of the machine is largely absorbed by the truck frame, thus preventing the derangement of the various machine elements and materially lengthening its period of usefulness. To the axle of the front wheel 6 the draft tongue 22 may be attached.

From the foregoing it will be seen that I have provided a supporting truck which is particularly adapted for use in connection with harrows, cultivators and other heavy agricultural machines.

While its construction is extremely simple the device is nevertheless durable and highly efficient in use.

While I have shown and described what I believe to be the preferred embodiment of my invention it will be obvious that numerous minor modifications may be resorted to without departing from the spirit or sacrificing any of the advantages of the invention.

Having thus described the invention what is claimed is:

1. In combination, truck wheels disposed in alinement with each other, a yoke straddling the front wheel having a vertical stud integrally formed therewith, a supporting bar having an enlarged end and an arm integrally formed therewith, the end of said bar and said arm being provided with openings to receive said stud, the other end of said bar being bifurcated to straddle the rear wheel and having its ends secured to the axle thereof, a rod pivoted between the ends of said bar, and a tubular member secured to a machine frame tongue adapted to receive said rod.

2. In combination, truck wheels arranged in horizontal alinement, a supporting bar extending between said wheels, a yoke straddling the front wheel having its arms vertically disposed and secured at their lower ends to the axle thereof, said yoke being circularly formed above the wheel, the upper end of said bar being horizontally extended and circularly formed, an arm integrally formed with said bar spaced from said circular end, the outer end of said arm being circular in plan and adapted to be disposed upon a circular portion of said yoke, said yoke having a vertical stud integrally formed therewith adapted to be positioned through a central aperture in said arm and the end of the bar, the rear end of said bar being bifurcated and straddling the rear wheel having its ends secured to the axle thereof, spaced ears integrally formed with said bar between its ends, a rod pivoted between said ears, a depending tubular member secured to the under side of a machine frame tongue, and a brace secured to said tongue and to the lower end of said member, said member being adapted to receive said pivoted rod.

In testimony whereof I hereunto affix my signature in the presence of two witnesses.

GEORGE G. HELMKE.

Witnesses:
O. H. BOCK,
HARRY WARREN.